US009825719B2

(12) United States Patent
Shirakata et al.

(10) Patent No.: US 9,825,719 B2
(45) Date of Patent: Nov. 21, 2017

(54) RADIO COMMUNICATION DEVICE AND METHOD OF CONTROLLING DIRECTIVITY

(71) Applicant: Panasonic Corporation, Osaka (JP)

(72) Inventors: Naganori Shirakata, Kanagawa (JP); Hiroyuki Motozuka, Kanagawa (JP)

(73) Assignee: PANASONIC CORPORATION, Osaka (JP)

(*) Notice: Subject to any disclaimer, the term of this patent is extended or adjusted under 35 U.S.C. 154(b) by 232 days.

(21) Appl. No.: 14/626,939

(22) Filed: Feb. 20, 2015

(65) Prior Publication Data

US 2015/0244478 A1      Aug. 27, 2015

(30) Foreign Application Priority Data

Feb. 27, 2014   (JP) .................................. 2014-037386

(51) Int. Cl.
*H04L 1/20*        (2006.01)
*H04W 24/10*   (2009.01)
*H04B 7/06*       (2006.01)
*H04B 17/309*   (2015.01)
*H04B 17/12*     (2015.01)
*H04W 16/28*   (2009.01)

(52) U.S. Cl.
CPC ............. *H04B 17/309* (2015.01); *H04B 7/06* (2013.01); *H04B 7/0617* (2013.01); *H04B 7/0695* (2013.01); *H04B 17/12* (2015.01); *H04L 1/203* (2013.01); *H04W 16/28* (2013.01)

(58) Field of Classification Search
None
See application file for complete search history.

(56) References Cited

U.S. PATENT DOCUMENTS 8,320,942 B2    11/2012  Sadri et al.
2002/0173312 A1*  11/2002  Takano .................. H04L 1/0009
                                                                  455/452.1
2007/0287384 A1   12/2007  Sadri et al.
(Continued)

FOREIGN PATENT DOCUMENTS

EP        1315314         5/2003
JP        2009-540765    11/2009
(Continued)

*Primary Examiner* — Kevin C Harper
*Assistant Examiner* — Derrick V Rose
(74) *Attorney, Agent, or Firm* — Seed IP Law Group LLP

(57) ABSTRACT

A radio communication device includes: a directivity control unit that configures each of directivities of a plurality of antennas; a directivity switching unit that switches between the directivities of the antennas; a reception quality estimation unit that measures a reception quality of a received signal received by the antennas; and a block error estimation unit that estimates a block error in reception data which is obtained by decoding the received signal. In the case where a block error occurs continuously for a predetermined number of times or longer and an amount of decrease in the reception quality is lower than a predetermined value, the directivity control unit re-adjusts a directivity to decrease the block error, based on a result of the estimation of the block error and a result of the measurement of the reception quality, the re-adjusted directivity being one of the directivities of the antennas.

8 Claims, 13 Drawing Sheets

(56) References Cited

U.S. PATENT DOCUMENTS

2009/0253438 A1* 10/2009 Chater-Lea ............ H01Q 1/242
    455/456.1
2010/0081469 A1*  4/2010 Kazmi ................ H04W 52/241
    455/522
2013/0182569 A1*  7/2013 Bertrand ............... H04L 1/0009
    370/232

FOREIGN PATENT DOCUMENTS

| | | |
|---|---|---|
| JP | 2011-515920 | 5/2011 |
| JP | 5048061 B2 | 10/2012 |
| WO | 2002/007342 | 1/2002 |
| WO | 2007/146733 | 12/2007 |
| WO | 2009/114629 | 9/2009 |

* cited by examiner

FIG. 7

| SECTOR NUMBER | PATTERN NUMBER | PHASE SHIFTER SETTING VALUE | | | |
|---|---|---|---|---|---|
| | | PHASE SHIFTER 1 | PHASE SHIFTER 2 | ... | PHASE SHIFTER N |
| 0 | 0-1 | θ1_0_1 | OFF | | OFF |
| 1 | 1-1 | θ1_1_1 | θ2_1_1 | | θN_1_1 |
| | 1-2 | θ1_1_2 | θ2_1_2 | | θN_1_2 |
| | ⋮ | | | | |
| | 1-L | θ1_1_L | θ2_1_L | | θN_1_L |
| 2 | 2-1 | | | | |
| | 2-2 | | | | |
| | ⋮ | | | | |
| | 2-L | | | | |
| ⋮ | ⋮ | | | | |
| K | K-1 | | | | θN_K_1 |
| | K-2 | | | | θN_K_2 |
| | ⋮ | | | | |
| | K-L | | | | θN_K_L |

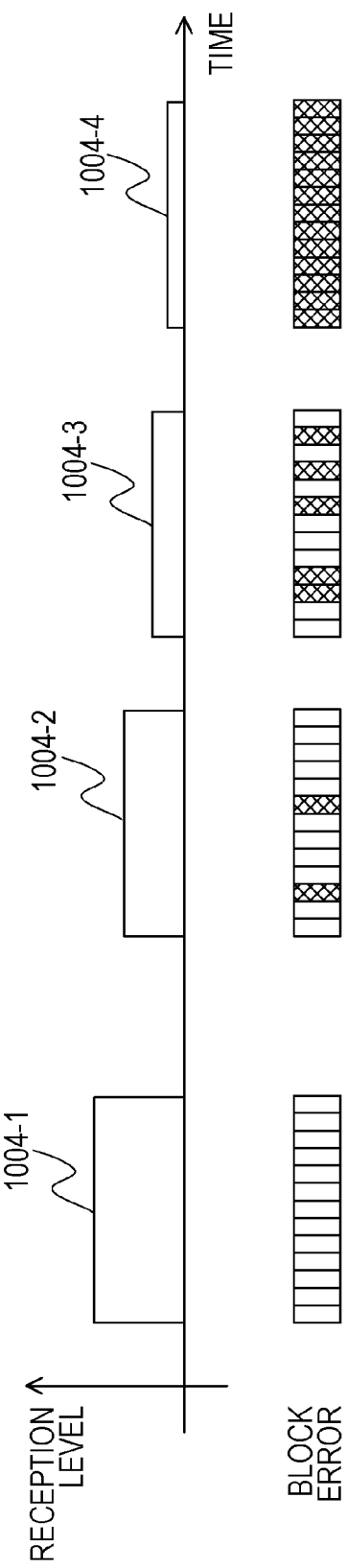

RADIO COMMUNICATION DEVICE AND METHOD OF CONTROLLING DIRECTIVITY

BACKGROUND

1. Technical Field

The present disclosure relates to a radio communication device having an antenna directivity and a method of controlling the directivity of the radio communication device.

2. Description of the Related Art

In recent years, study of radio communication standard using extremely high frequency bands has been progressed, and for example, wireless personal area network (PAN) standard IEEE802.15.3c and wireless local area network (LAN) standard IEEE802.11ad, each using 60 GHz band in the millimeter wave band, have been established.

In the millimeter wave band, radio waves have such characteristics that rectilinear propagation property is high and attenuation in space is large, and thus beam-forming technology is utilized in radio communication in a millimeter wave band, the beam-forming technology controlling directivity using a plurality of antennas. In the above-mentioned IEEE802.15.3c standard and IEEE802.11ad standard, a protocol for the beam-forming is defined. However, specific directivity control method depends on how the protocol is implemented.

Japanese Patent No. 5048061, Japanese Unexamined Patent Application Publication (Translation of PCT Application) (JP-T) No. 2011-515920, and Japanese Patent No. 3902549 are known as related art regarding beam-forming training in which directivity tracking is performed correspondingly to environmental change during data communication.

SUMMARY

In related art, when interference from another device occurs during data communication, there is a problem in that appropriate directivity control is difficult One non-limiting and exemplary embodiment provides a radio communication device capable of avoiding interference autonomously in consideration of interference in data communication.

In one general aspect, the techniques disclosed here feature a radio communication device including: a directivity control unit that configures each of directivities of a plurality of antennas; a directivity switching unit that switches between the directivities of the antennas; a reception quality estimation unit that measures a reception quality of a received signal received by the antennas; and a block error estimation unit that estimates a block error in reception data which is obtained by decoding the received signal. In the case where a block error occurs continuously for a predetermined number of times or longer and an amount of decrease in the reception quality is lower than a predetermined value, the directivity control unit re-adjusts a directivity to decrease the block error, based on a result of the estimation of the block error and a result of the measurement of the reception quality, the re-adjusted directivity being one of the directivities of the antennas.

According to the present disclosure, autonomous interference avoidance is possible in consideration of interference in data communication.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating an example of a phase table;

FIG. 8A illustrates an example of beam patterns corresponding to sector numbers, and FIG. 8B illustrates an example of beam patterns corresponding to pattern numbers;

FIG. 9 illustrates the manner in which data errors occur in the case where a reception level is decreased;

DETAILED DESCRIPTION

Figure 1:
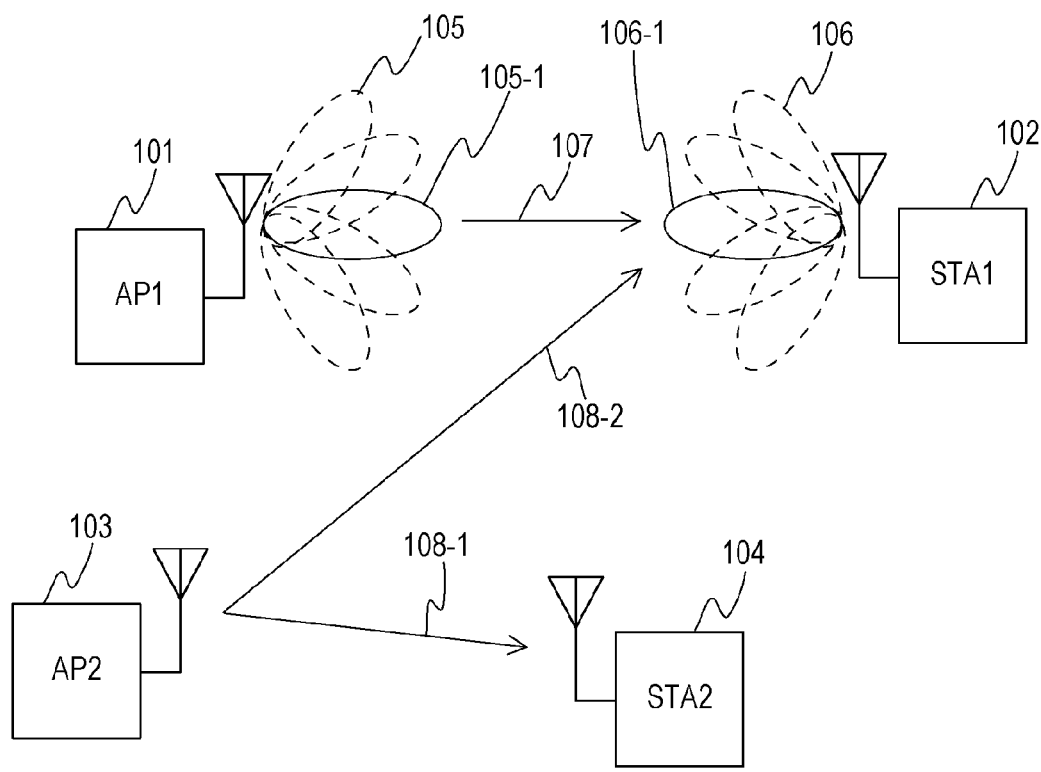
FIG. 1 is a diagram illustrating a schematic configuration of a radio communication system including a plurality of radio communication devices that controls directivity.

Underlying Knowledge Forming Basis of the Present Disclosure

First, a problem of directivity control with occurrence of interference from another device will be described before a description is given of an embodiment of a radio communication device and a method of controlling directivity according to the present disclosure.

The above-mentioned Japanese Patent No. 5048061 discloses a technology by which a link is re-established in the case where viewing between communication devices is blocked and link quality deteriorates. However, in Japanese Patent No. 5048061, a link quality is determined based on the packets from a communication destination, and interference due to transmission signals from other than the communication destination is not taken into consideration.

In addition, JP-T No. 2011-515920 discloses a technology by which beam tracking is performed by gradually changing an antenna weight vector during data packet switching in a communication device. However, in JP-T No. 2011-515920, a link quality is determined based on the packets from a communication destination, and interference from other devices is not taken into consideration.

Furthermore, Japanese Patent No. 3902549 discloses a technology by which a directivity pattern is switched to a non-directivity pattern in the case where a reception error is detected during communication having a directivity achieved by the directivity pattern. However, in Japanese Patent No. 3902549, a factor of the reception error is not estimated and it is difficult to control the directivity according to an error factor, for example, at the time of interference occurrence.

As described above, in the case where interference from other devices occurs during communication, appropriate directivity control may not be performed and it is difficult to ensure the quality of communication in related art. Also, a problem arises in that the device size or the overhead of a protocol is increased in order to control the directivity in consideration of interference.

In view of the above problem, the present disclosure illustrates an example of a radio communication device and a method of controlling directivity, the radio communication device being operative to autonomously avoid interference with a smaller overhead in consideration of interference in data communication when antenna directivity is controlled in radio communication.

<Embodiment of the Present Disclosure>

Hereinafter, an embodiment according to the present disclosure will be described in detail with reference to the accompanying drawings. It should be noted that in the drawings referenced in the following description, the same components are denoted by the same symbol and redundant description will be omitted.

(Schematic Configuration of Wireless Communication System)

FIG. 1 is a diagram illustrating a schematic configuration of a radio communication system including a plurality of radio communication devices that controls directivity.

A radio communications system includes a first access point (AP1) 101, a second access point (AP2) 103, a first terminal station (STA1) 102, and a second terminal station (STA2) 104. The access points 101, 103 and the terminal stations 102, 104 are each a radio communication device that performs radio communication while controlling the directivity of transmission and reception. The access points 101, 103 and the terminal stations 102, 104 each have a directional antenna to perform communication by selecting a beam pattern from a plurality of beam patterns, the beam pattern being suitable for a communication destination.

Hereinafter, the first access point (AP1) 101, the first terminal station (STA1) 102, the second access point (AP2) 103, and the second terminal station (STA2) 104 are referred to as an access point AP1, a terminal station STA1, an access point AP2, and a terminal station STA2, respectively.

Here, a case is assumed where the access point AP1 and the terminal station STA1 communicate with each other, and the access point AP2 and the terminal station STA2 communicate with each other. The access point AP1 and the terminal station STA1, and the access point AP2 and the terminal station STA2 are independent networks in which communication is performed in an asynchronous state. In the following, the communication between the access point AP1 and the terminal station STA1 will be described.

In FIG. 1, a radio signal 107 is a signal having a desired wave, the signal being transmitted from the access point AP1 to the terminal station STA1, and a radio signal 108-1 is a signal having a desired wave, the signal being transmitted from the access point AP2 to the terminal station STA2. An interfering signal 108-2 is a radio signal as an interference wave, the radio signal being transmitted from the access point AP2 toward the terminal station STA2 but to the terminal station STA1 as interference.

The access point AP1 is capable of forming a plurality of beam patterns 105 by directivity control. The terminal station STA1 is capable of forming a plurality of beam patterns 106 by directivity control.

For example, the access point AP1 selects a beam pattern 105-1, which is indicated by a solid line, from the beam patterns 105, and the terminal station STA1 selects a beam pattern 106-1, which is indicated by a solid line, from the beam patterns 106 for communication. Similarly, the access point AP2 communicates with the terminal station STA2.

When the access point AP2 and the terminal station STA2 communicate with each other via the radio signal 108-1 during communication between the access point AP1 and the terminal station STA1 via the radio signal 107, radio waves are emitted in a direction other than the direction of the radio signal 108-1, and thus a radio signal addressed to the terminal station STA2 is also emitted in the direction of the terminal station STA1.

The terminal station STA1 receives the radio signal 108 from the access point AP2 as an interfering signal 108-2 because the radio signal 108 is not a signal addressed to the terminal station STA1. FIG. 1 illustrates an example of interference while the terminal station STA1 is receiving a signal, where the interference occurs in a combination of the access point AP1, the terminal station STA1, the access point AP2, and the terminal station STA2. Although, a state of interference from another station differs according to the distance, location of each radio communication device, a radio signal propagates in multipath due to reflection of radio waves, and thus an interference wave may arrive from multiple directions not in the line-of-sight (LOS) direction from the another station.

(Configuration of Wireless Communication Device)

Figure 2:
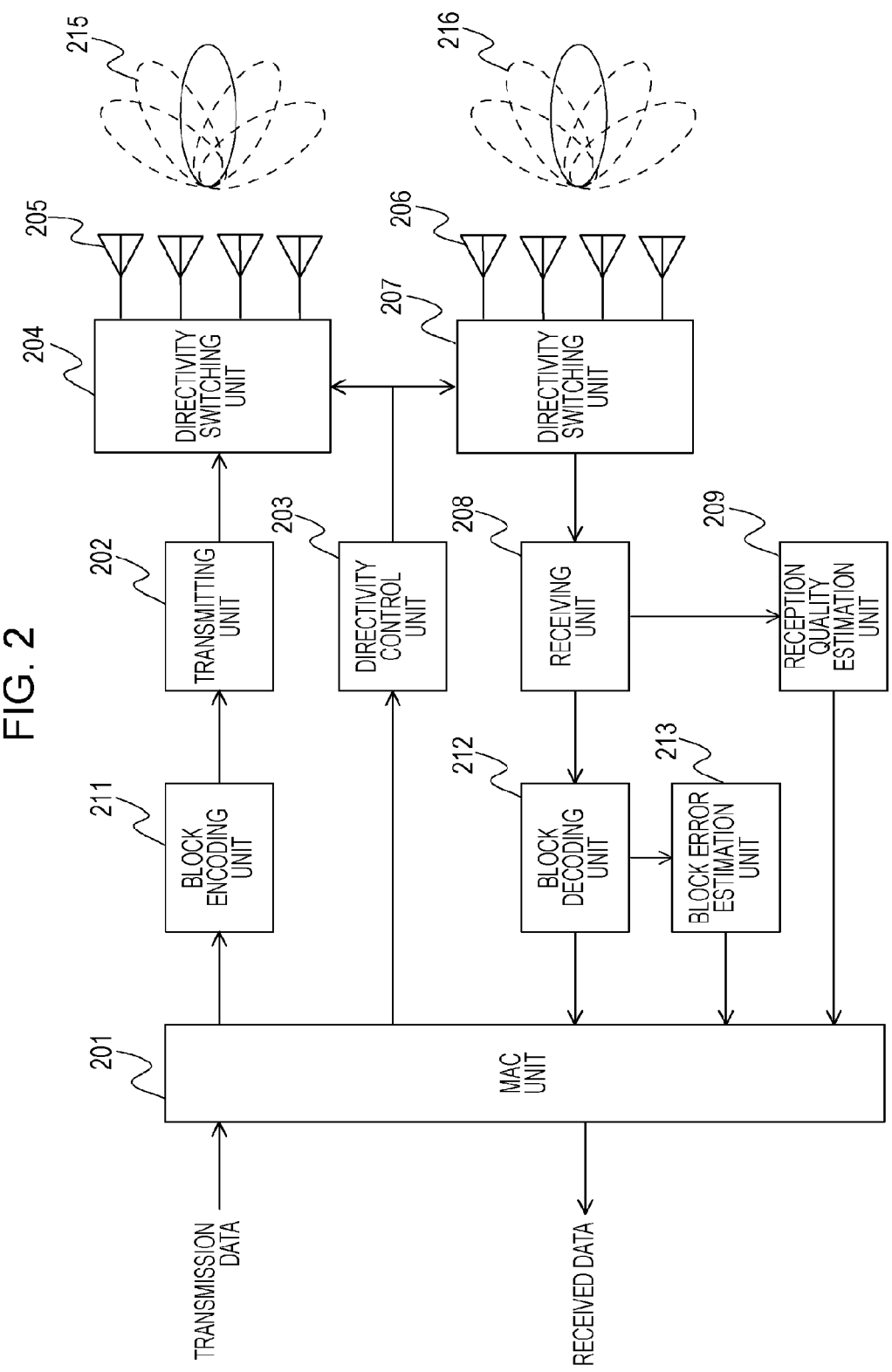
FIG. 2 is a block diagram illustrating the configuration of a radio communication device which is used for an access point and a terminal station.

FIG. 2 is a diagram illustrating the configuration of a radio communication device which is used for the access points 101, 103 and the terminal stations 102, 104.

The radio communication device includes a media access control (MAC) unit 201, a block encoding unit 211, a transmitting unit 202, a directivity control unit 203, a transmission-side directivity switching unit 204, transmitting antennas 205, receiving antennas 206, a receiving-side directivity switching unit 207, a receiving unit 208, a reception quality estimation unit 209, a block decoding unit 212, and a block error estimation unit 213.

The radio communication device transmits a radio signal via one of a plurality of transmitting beam patterns 215 using the plurality of transmitting antennas 205, and receives a radio signal via one of a plurality of receiving beam patterns 216 using the receiving antennas 206.

FIG. 2 illustrates a configuration including the transmission-side directivity switching unit 204 and the receiving-side directivity switching unit 207, and the transmitting antennas 205 and the receiving antennas 206 separately. However, a configuration may be adopted which has a single unit for both transmission and reception use.

At the time of transmission of the radio communication device, once transmission data is inputted to the MAC unit 201, the MAC unit 201 controls transmission timing in accordance with a communication protocol, converts the transmission data into a frame, and outputs the data frame to the block encoding unit 211.

In addition, the MAC unit 201 determines a transmission directivity according to a communication destination and informs the directivity control unit 203 of the transmission directivity. The directivity control unit 203 outputs directivity pattern information to the directivity switching unit 204, the directivity pattern information for configuring the determined transmission directivity.

The block encoding unit 211 divides the data frame into blocks each having a predetermined size, and performs error correction encoding for each block. The transmitting unit 202 performs, for example, signal modulation on the block-encoded data frame and adds a preamble to the data frame in accordance with the format of a physical layer to packetize the data frame for transmission.

The directivity switching unit 204 frequency-converts the packetized transmission signal into a radio frequency signal suitable for radio transmission, and converts the frequency of the transmission signal and controls the amplitude and phase thereof based on the directivity pattern information from the directivity control unit 203. For this reason, transmission may be made using a beam pattern selected from the plurality of beam patterns 215. The plurality of transmission antennas 205 transmits the transmission signal that has undergone the frequency conversion, the amplitude control, and the phase control.

Figure 3:
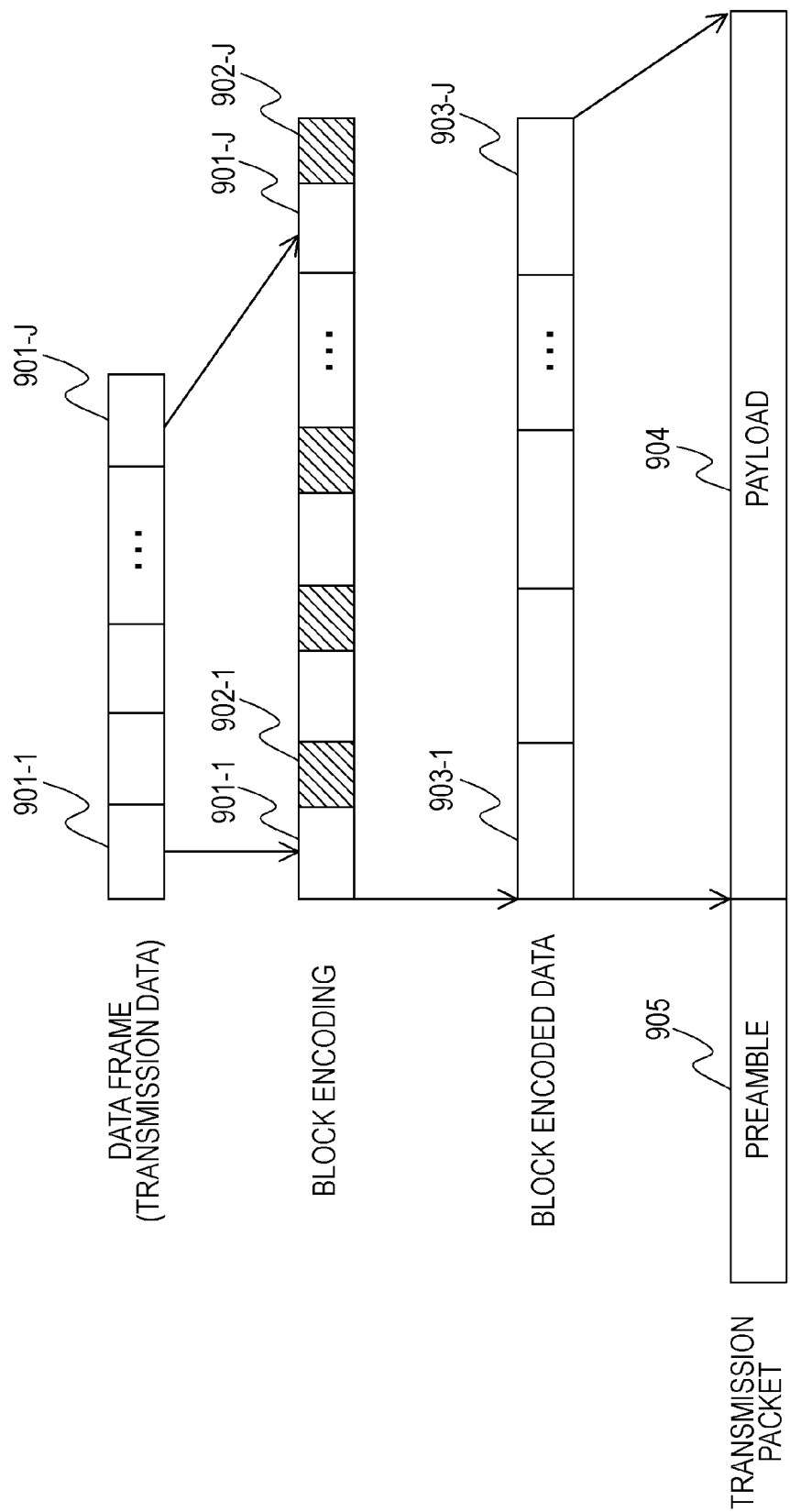
FIG. 3 is a diagram illustrating a procedure of encoding transmission data.

FIG. 3 is a diagram illustrating a procedure of encoding transmission data. The data frame of the transmission data inputted to the block encoding unit 211 is a bit stream, and the block encoding unit 211 divides the data frame into blocks 901-1 to 901-J according to an encoding size. The encoding size is determined by an error correcting code and an encoding rate. For example, in IEEE802.11ad standard, the LDPC code having a code word size of 672 bits is used, and the number of data bits is 336 bits with an encoding rate of ½. That is, the bit stream of the data frame is divided into blocks each having 336 bits.

The block encoding unit 211 performs block encoding on each of the divided blocks 901-1 to 901-J and adds error correcting codes (parity symbols) 902-1 to 902-J on the respective blocks 901-1 to 901-J. For example, in IEEE802.11ad standard, with an encoding rate of ½, the block 901-1 has the number of data bits of 336 bits, and the error correcting code 902-1 has 672−336=336 bits.

The block encoding unit 211 connects the blocks 901-1 to 901-J and the error correcting codes 902-1 to 902-J, and outputs block encoded data 903-1 to 903-J. The block encoded data 903-1 is the data obtained by connecting the block 901-1 and the error correcting code 902-1.

The data frame, which has been block-encoded by the block encoding unit 211, is inputted to the transmitting unit 202. The transmitting unit 202 modulates the inputted block encoded data in accordance with a predetermined modulation scheme, for example, by BPSK, QPSK, 16QAM, or OFDM, and generates a payload section 904 of the transmission packet.

In addition, the transmitting unit 202 adds a preamble 905 to the front of the payload section 904 and outputs the resultant frame as a transmission packet, the preamble 905 being a known pattern used, for example, for synchronous detection.

At the time of reception by the radio communication device, the MAC unit 201 controls reception timing and starts reception processing. In addition, the MAC unit 201 determines a reception directivity according to the communication destination, and informs the directivity control unit 203 of the reception directivity. The directivity control unit 203 outputs directivity pattern information to the directivity switching unit 207, the directivity pattern information for configuring the determined reception directivity.

The directivity switching unit 207 controls the amplitude and phase of a signal received by the plurality of receiving antennas 206, based on the directivity pattern information from the directivity control unit 203, and converts the frequency of the signal into a frequency band which is suitable for performing receive by the receiving unit 208.

For the reception signal having a converted frequency, the receiving unit 208 performs, for example, preamble detection, frequency synchronization, symbol synchronization, and signal demodulation of the reception packet in accordance with the format of a physical layer, and outputs a demodulated bit stream to the block decoding unit 212. The reception quality estimation unit 209 estimates the reception quality of a received signal using mainly known patterns of preamble. As the reception quality estimated by the reception quality estimation unit 209, various signal quality indices are used, including a reception level, a received signal strength indicator (RSSI), a signal to noise ratio (SNR), a signal to interference and noise ratio (SINR), a channel impulse response, and a noise level.

The block decoding unit 212 divides the demodulated bit stream into blocks each having a predetermined size, performs error correction decoding for each block, and converts the decoded bit stream into a data frame to be outputted to the MAC unit 201. Furthermore, the block decoding unit 212 outputs information on the error correction to the block error estimation unit 213. The block error estimation unit 213 estimates a block error in the reception data and informs the MAC unit 201 of a result of the estimation. The MAC unit 201 retrieves reception data from the reception data frame.

Figure 4:
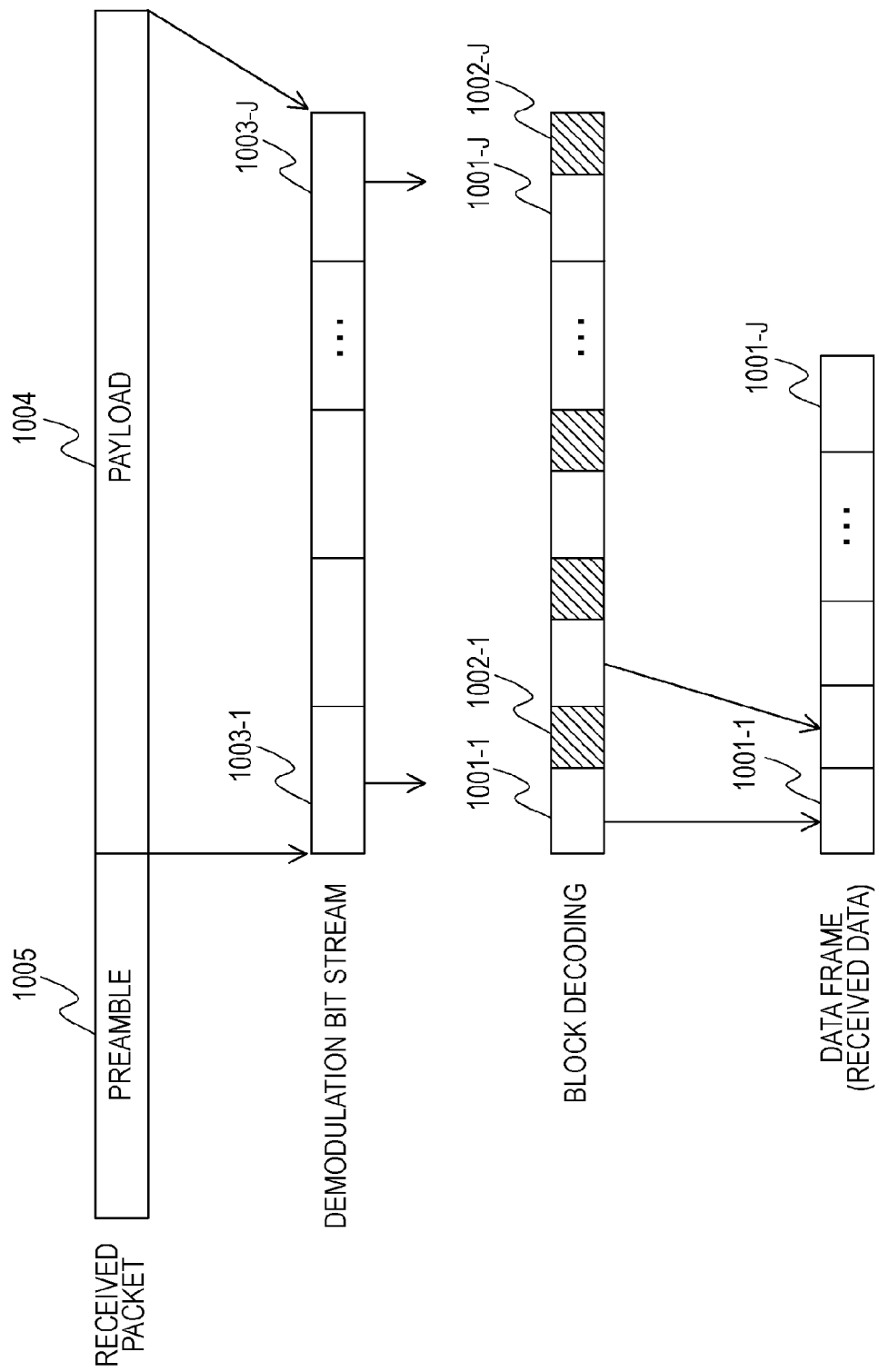
FIG. 4 is a diagram illustrating a procedure of decoding reception data.

FIG. 4 is a diagram illustrating a procedure of decoding the reception data. Each received packet inputted to the receiving unit 208 has a preamble 1005 and a payload 1004. The receiving unit 208 performs, for example, automatic gain control (AGC), preamble detection, frequency synchronization, symbol synchronization, and channel estimation using the characteristics of the preamble 1005 which is a known pattern, and decodes and demodulates the payload 1004 to a signal.

The block decoding unit 212 divides the demodulated bit stream into blocks 1003-1 to 1003-J according to the encoding size at the time of transmission. For example, in the example of IEEE802.11ad standard, the block 1003-1 to 1003-J are divided blocks each having 672 bits.

The block decoding unit 212 performs error correction decoding on each divided block, and divides the blocks into error corrected data bits 1001-1 to 1001-J and unnecessary error correcting codes 1002-1 to 1002-J. The block decoding unit 212 retrieves the error corrected data bits 1001-1 to 1001-J and connects the data bits to output the connected data bits as the data frame of reception data.

Figure 5:
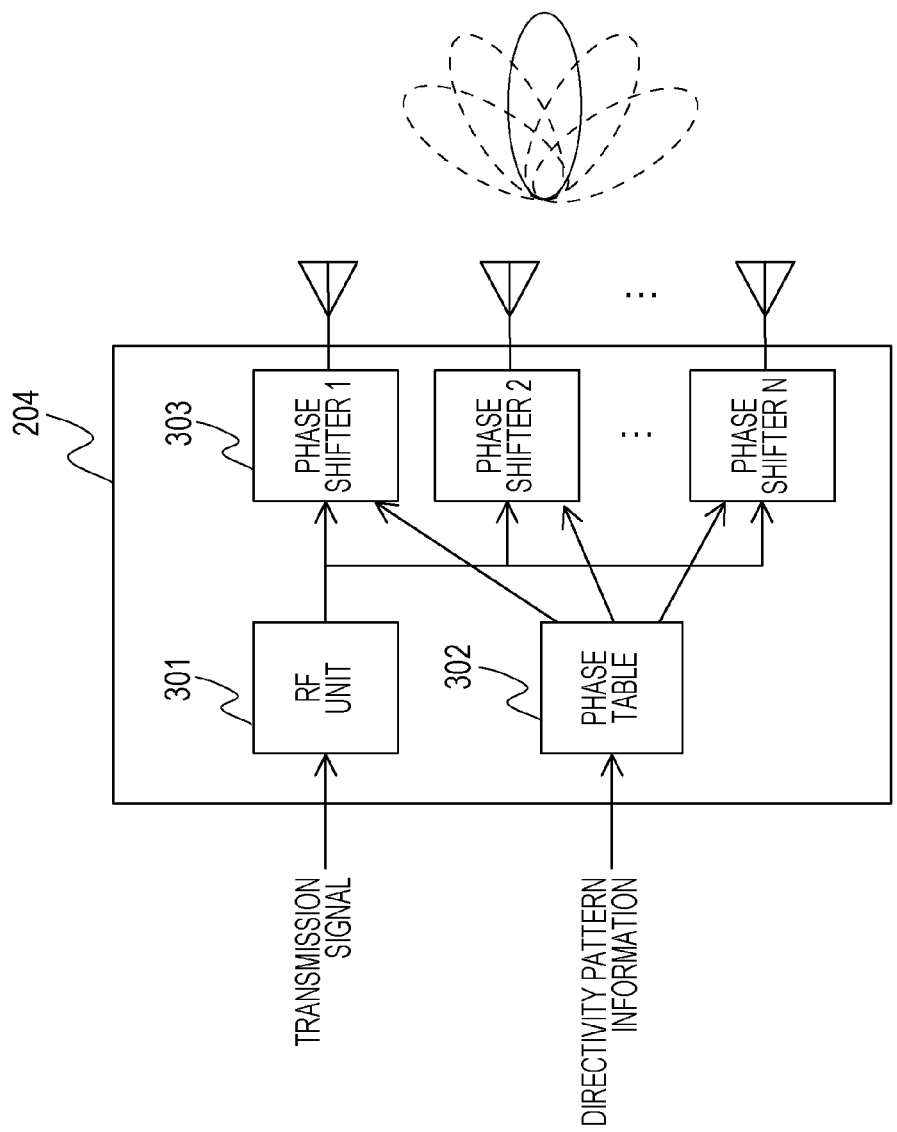
FIG. 5 is a diagram illustrating an example of a configuration of a directivity switching unit.

FIG. 5 is a diagram illustrating an example of a configuration of the directivity switching unit 204. The directivity switching unit 204 includes a radio frequency (RF) unit 301, a phase table 302, and a plurality of phase shifters (phase shifter 1 to N) 303. The configuration of FIG. 5 is an example of the analog beam-former that forms a directivity by shifting the phase of a signal in a radio frequency band.

The RF unit 301 frequency-converts an inputted transmission signal into a radio frequency signal suitable for radio transmission. For example, the transmission signal is a signal in a baseband band, and the radio frequency signal is up-converted to 60 GHz band in the millimeter wave band. Optionally, the transmission signal may be a signal in an intermediate frequency (IF) band, for example, a signal in 5 GHz bandwidth, and the radio frequency signal may be up-converted to 60 GHz band in the millimeter wave band. The up-converted radio frequency signal is distributed and inputted to a plurality of phase shifters 303.

The phase shifters 303 sets the phase or amplitude, or the phase and amplitude of a radio frequency signal to predetermined values to be outputted and sends the values from each transmission antenna 205. The setting values of the phase and amplitude of each of the phase shifters 303 are set by the setting parameters from the phase table 302. The phase table 302 outputs a sector number and a pattern number as setting parameters corresponding to the directivity pattern information inputted from the directivity control unit 203. The sector number and the pattern number will be described later.

Figure 6:
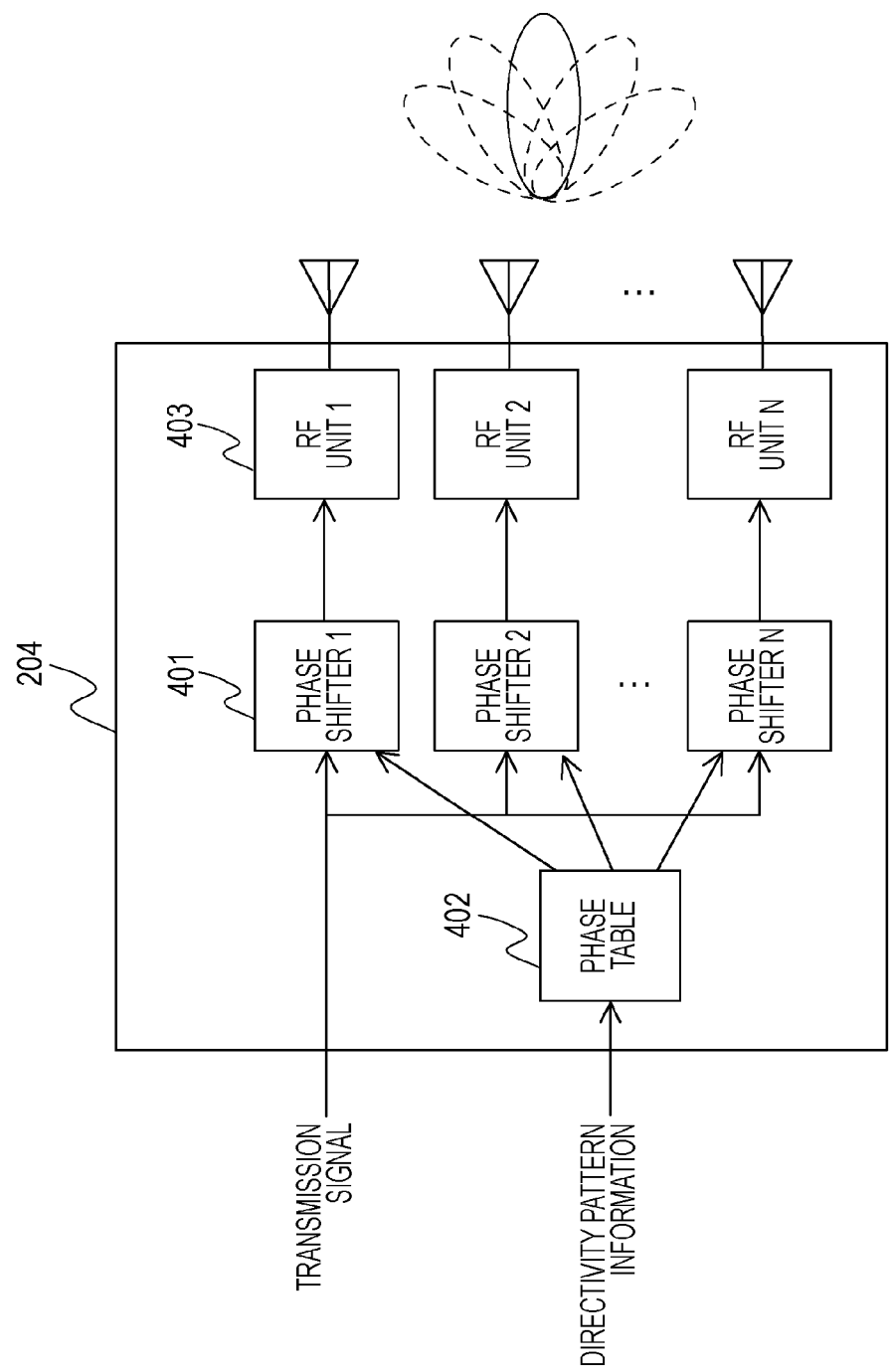
FIG. 6 is a diagram illustrating an another example of a configuration of a directivity switching unit.

FIG. 6 is a diagram illustrating an another example of a configuration of the directivity switching unit 204. The directivity switching unit 204 includes a plurality of phase shifters (phase shifters 1 to N) 401, a phase table 402, and a plurality of radio frequency units (RF units 1 to N) 403. The configuration of FIG. 6 is an example of digital beamformer that performs phase shift in a baseband band to form a directivity.

The inputted transmission signal is distributed to the plurality of phase shifters 401. The plurality of phase shifters 401 sets the phase or amplitude, or the phase and amplitude of a signal before up-conversion to predetermined values, and outputs the values to the RF units 403, the signal being a signal in the baseband band, for example. The setting values of the phase and amplitude of each of the phase shifters 401 are set by the setting parameters from the phase table 402. The phase table 402 outputs a sector number and a pattern number as setting parameters corresponding to the directivity pattern information inputted from the directivity control unit 203.

The plurality of RF units 403 each frequency-converts an output signal from each of the phase shifters 401 to a radio frequency signal suitable for radio transmission for output, and transmits the radio frequency signal from each transmission antenna 205.

It should be noted that although FIG. 5 and FIG. 6 each illustrate an example of configuration of the transmission-side directivity switching unit 204, the receiving-side directivity switching unit 207 may be implemented as a configuration in which the directions of input and output of signal are reversed.

Figure 8A:
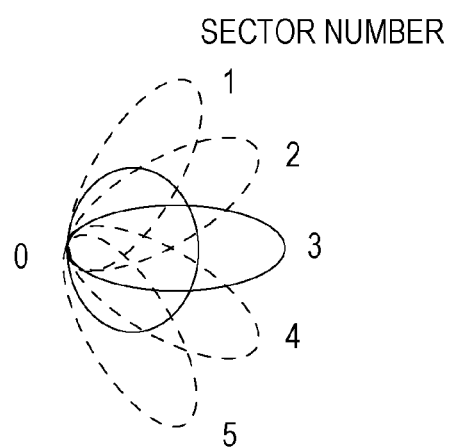
FIGS. 8A and 8B each illustrate beam patterns corresponding to directivity pattern information.
Figure 8B:
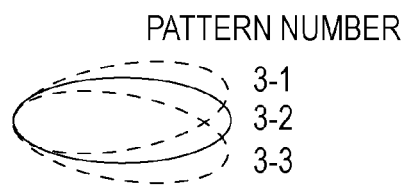

FIG. 7 is a diagram illustrating an example of a phase table 302 or 402. FIGS. 8A and 8B each illustrate beam patterns corresponding to directivity pattern information, FIG. 8A illustrates an example of beam patterns corresponding to sector numbers, and FIG. 8B illustrates an example of beam patterns corresponding to pattern numbers.

A sector number determines a coarse direction (directivity) of one of the beam patterns. For example, in FIG. 8A, five directivity patterns and 0th quasi omni pattern are set, the five directivity patterns each of which has a main beam facing a corresponding one of the directions of 1st to 5th sector numbers, the quasi omni pattern having a characteristic close to non-directivity. A pattern number indicates a beam having a directivity obtained by finely adjusting the direction of the beam of each sector number.

For example, a sector number may determine the direction for 30° interval in the range of 150°, and a pattern number may determine the direction for ±15° interval centered on the direction of the sector number. A setting angle interval, a setting angle range for a directivity associated with a sector number, and an adjustment angle interval, an adjustment angle range for a directivity associated with a pattern number may be appropriately defined in any manner. The setting may be made not for adjusting the direction of a beam but for adjusting the magnitude of gain.

The directivity of a beam is defined by a phase table using a sector number and a pattern number, and in order to obtain a desired beam pattern, a setting parameter θ is pre-defined, the setting parameters θ indicating the phase and amplitude that are set in each phase shifter.

When a sector number and a pattern number are informed as directivity pattern information from the directivity control unit 203, the phase table retrieves a setting parameter θ for each phase shifter from the parameter table illustrated in FIG. 7, the setting parameter θ corresponding to the sector number and the pattern number, and outputs the setting parameter θ to the phase shifter to set the phase and amplitude.

It should be noted that the MAC unit 201, the block encoding unit 211, the directivity control unit 203, the reception quality estimation unit 209, the block decoding unit 212, and the block error estimation unit 213 described above may be achieved using an information processing circuit block or a computer with an integrated circuit including a processor and a memory. The function relevant to each unit is achieved by executing a predetermined program to perform processing in an information processing circuit block or a computer.

(Operation Before Start of Communication)

Before the above-described radio communication devices each having a directivity control unit and a directivity switching unit start communication, beam-forming training is performed in which mutual directivities are matched. As an example of beam-forming training, a sector level sweep (SLS) is known.

In SLS, one radio communication device switches between the sectors for beam pattern and transmits or receives a predetermined packet, and the other radio communication device transmits or receives the packet with quasi omni directivity and feeds back which sector provides better communication quality of the packet which is transmitted or received from or by the sector. The above-described procedure is performed in forward and reverse combinations of transmission and reception, and each one directivity is matched with the other directivity of the radio communication device at the communication destination station. Each radio communication device starts data communication with the communication destination station using the both directivity patterns which are determined by the beam-forming training.

(State of Block Error Occurred in Received Packet)

When data communication is made with mutually matched directivities at the originating station and the communication destination station, a favorable state of reception level is maintained, and thus communication may be made in which occurrence of data error in a communication packet is restrained. However, for example, in the case where the directivity deviates from a matching state due to a change in the orientation, position of a terminal, the reception level decreases rapidly.

FIG. 9 illustrates the manner in which data errors occur in the case where the reception level is decreased. FIG. 9 illustrates received packets 1004-1 to 1004-4 in time series and the respective reception levels in the receiving-side radio communication device. In FIG. 9, the block illustrated below each received packet indicates a presence of a block error for each encoded block in each packet. In the encoded blocks, an unshaded block indicates a state without an error in the block and a hatched block indicates a state with an error in the block.

For example, the first received packet 1004-1 is in a state with favorable reception level and thus no error occurs in all blocks. Because the directivity changes as the time elapses, the reception level decreases in the flow from the received packet 1004-2 to the received packet 1004-4. For this reason, an increase in signal to white noise ratio due to decrease in the reception level causes random block errors to occur in the packets.

Figure 10:
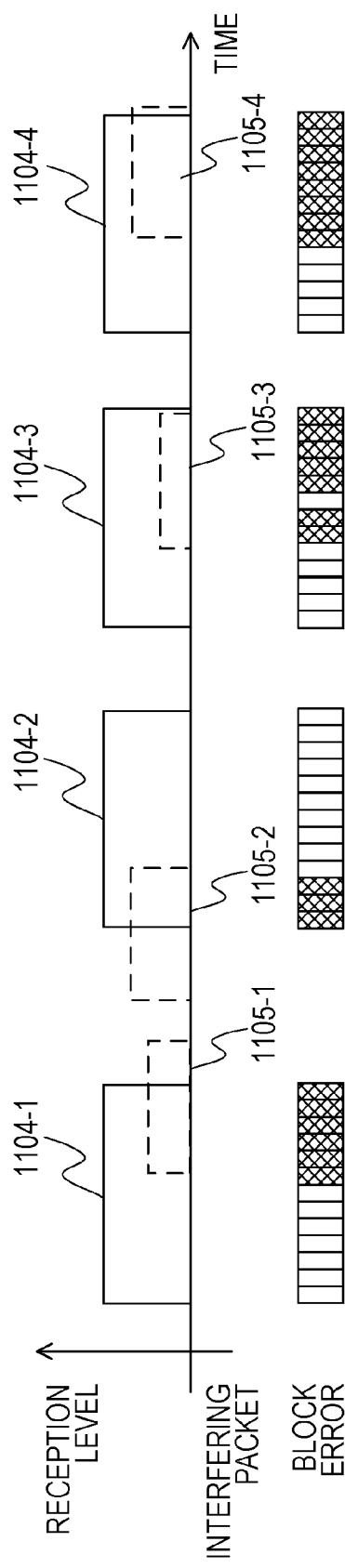
FIG. 10 illustrates the manner in which data errors occur in the case where there is interference from another radio communication device.

FIG. 10 illustrates the manner in which data errors occur in the case where there is interference from another radio communication device. FIG. 10 illustrates received packets 1104-1 to 1104-4 received at the terminal station STA1 and the respective reception levels, the packets 1104-1 to 1104-4 being transmitted from the access point AP1 to the terminal station STA1 in time series. In addition, interfering packets 1105-1 to 1105-4 arrived asynchronously at the terminal station STA1 are illustrated, the interfering packets 1105-1 to 1105-4 being transmitted from the access point AP2 to the terminal station STA2.

In the case where no directivity deviation occurs between the access point AP1 and the terminal station STA1, the received packets 1104-1 to 1104-4 have a favorable reception level. However, the interfering packets 1105-1 to 1105-4, which arrive asynchronously, collide with the received packets 1104-1 to 1104-4. In the received packets 1104-1 to 1104-4, a block error occurs continuously at the portions with which the interfering packets 1105-1 to 1105-4 collide.

In a situation where a block error occurs due to different factors like the above, the operation of beam-forming training will be described below where the interfering signals from other than the communication destination station are taken into consideration while utilizing the directivity control according to the present embodiment.

Figure 11:
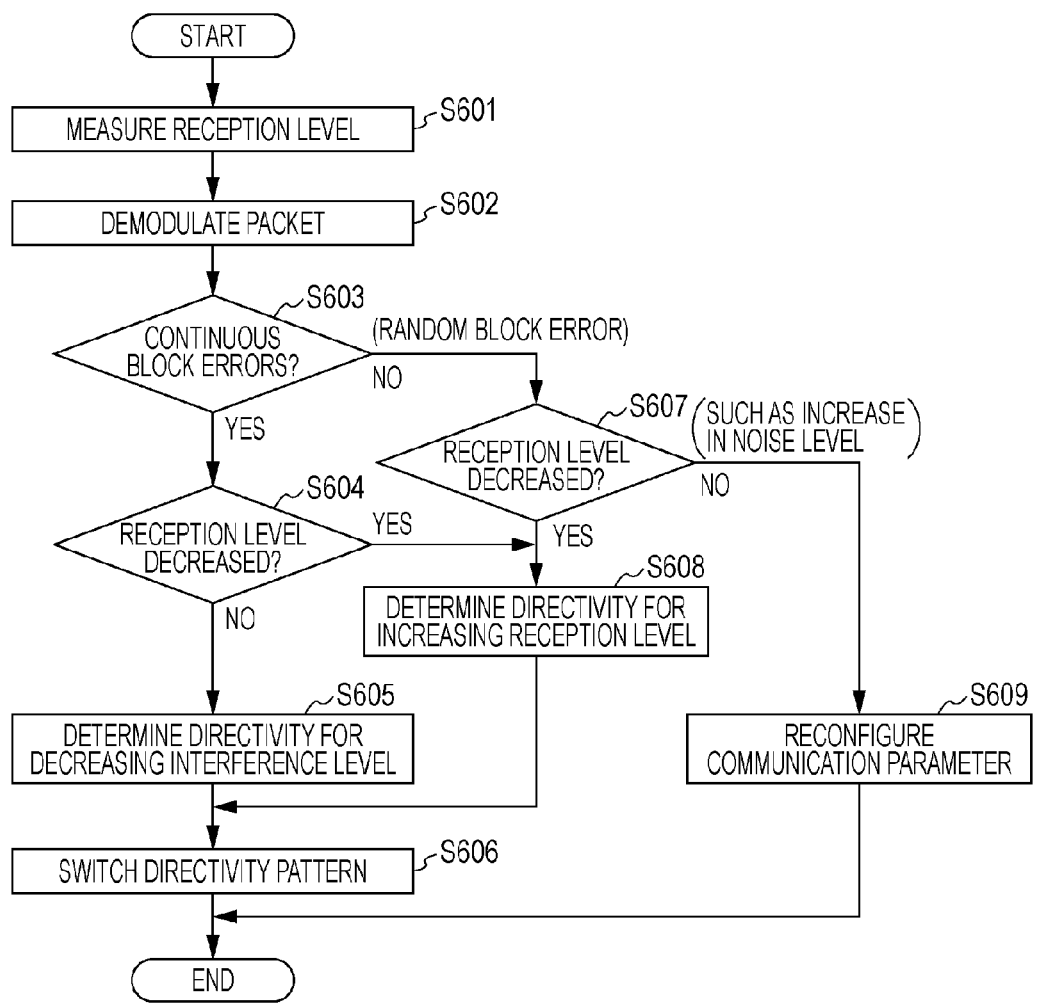
FIG. 11 is a flow chart illustrating the operational procedure of directivity control after start of communication performed by a radio communication device in the present embodiment.

(Directivity Control Operation after Start of Communication in Present Embodiment FIG. 11 is a flow chart illustrating the operational procedure of directivity control after start of communication performed by the radio communication device in the present embodiment. In the procedure illustrated in FIG. 11, the directivity control unit 203 in the radio communication device autonomously performs processing.

When the radio communication device starts to receive packets, the reception level of each received packet is measured by the reception quality estimation unit 209 and a value is stored in the memory of the directivity control unit 203 (step S601). Subsequently, the radio communication device demodulates the received packet by the receiving unit 208, and detects a block error by the block decoding unit 212 (step S602).

When a block error occurs, the directivity control unit 203 of the radio communication device determines based on a result of the error estimation made by the block error estimation unit 213 whether a block error occurs for a predetermined number or longer in continuous blocks (continuous block errors) or a block error occurs in random blocks (random block errors) in the packets (step S603). For example, in the case where a block error occurs continuously for a predetermined number of times k or longer, it may be determined that continuous block errors have occurred.

In the case where continuous block errors occur, the directivity control unit 203 of the radio communication device determines whether or not the reception level has decreased, based on a result of the measurement made by the reception quality estimation unit 209 (step S604). When it is determined that the amount of decrease in the reception level is lower than a predetermined value, the directivity control unit 203 determines that the cause is not the deviation of the directivity of the communication via the local terminal station, but a block error due to interference collision, and the flow proceeds to step S605.

In step S605, the directivity control unit 203 of the radio communication device changes the pattern numbers in the directivity pattern information to be informed to the directivity switching unit 207, finely adjusts the beam pattern in a sector, and determines a beam directivity for decreasing an interference level.

The directivity control unit 203 then changes the pattern numbers in the directivity pattern information in order to finely adjust (re-adjust) the directivity so as to decrease the interference level, and switches between the beam patterns (step S606). When fine adjustment of directivity is made, the current beam pattern is switched in turn to one of the beam patterns for a plurality of pattern numbers, for example, and the best pattern number which allows less interference is selected, or a pattern number which allows the interference level to be lower than a predetermined threshold value is selected. Subsequently, the radio communication device prepares for receiving the next packet.

On the other hand, when it is determined that the amount of decrease in the reception level is higher than or equal to the predetermined value in step S604, the directivity control unit 203 determines that occurrence of a block error is caused by decrease in the reception level due to deviation of the directivity of the communication via the local terminal station, and the flow proceeds to step S608.

In step S608, the directivity control unit 203 of the radio communication device changes the pattern numbers in the directivity pattern information to be informed to the directivity switching unit 207, finely adjusts the beam pattern in a sector, and determines a beam directivity so as to increase the reception level.

The directivity control unit 203 then changes the pattern numbers in the directivity pattern information in order to finely adjust the directivity so as to increase the reception level, and switches between the beam patterns (step S606). When fine adjustment of directivity is made, the current beam pattern is switched in turn to one of the beam patterns for a plurality of pattern numbers, for example, and the best pattern number which allows higher reception level is selected, or a pattern number which allows the reception level to be higher than a predetermined threshold value is selected. Subsequently, the radio communication device prepares for receiving the next packet.

In step S603, when it is determined that not continuous block errors but random block errors have occurred, the directivity control unit 203 determines whether or not the reception level has decreased, based on a result of the measurement made by the reception quality estimation unit 209 (step S607). When it is determined that the amount of decrease in the reception level is higher than or equal to a predetermined value, the directivity control unit 203 determines that the decrease in the reception level is due to deviation of the directivity of the communication via the local terminal station. The flow then proceeds to step S608, S606, and switches between the beam patterns in order to finely adjust the directivity so as to increase the reception level.

On the other hand, when it is determined that the amount of decrease in the reception level is lower than the predetermined value in step S607, the flow proceeds to step S609, and the MAC unit 201 of the radio communication device re-adjusts communication parameters. For example, change in communication environment is estimated, the change including an increase in noise level of white noise due to a temperature change and deviation of gain setting on standby as an example. Therefore, the MAC unit 201 makes a change on parameters and reconfigures communication parameters, the change including change to a modulation scheme or an encode rate which are resistant against a high noise level, re-calibration of the RF units, and switching between frequency channels, as an example.

Figure 12:
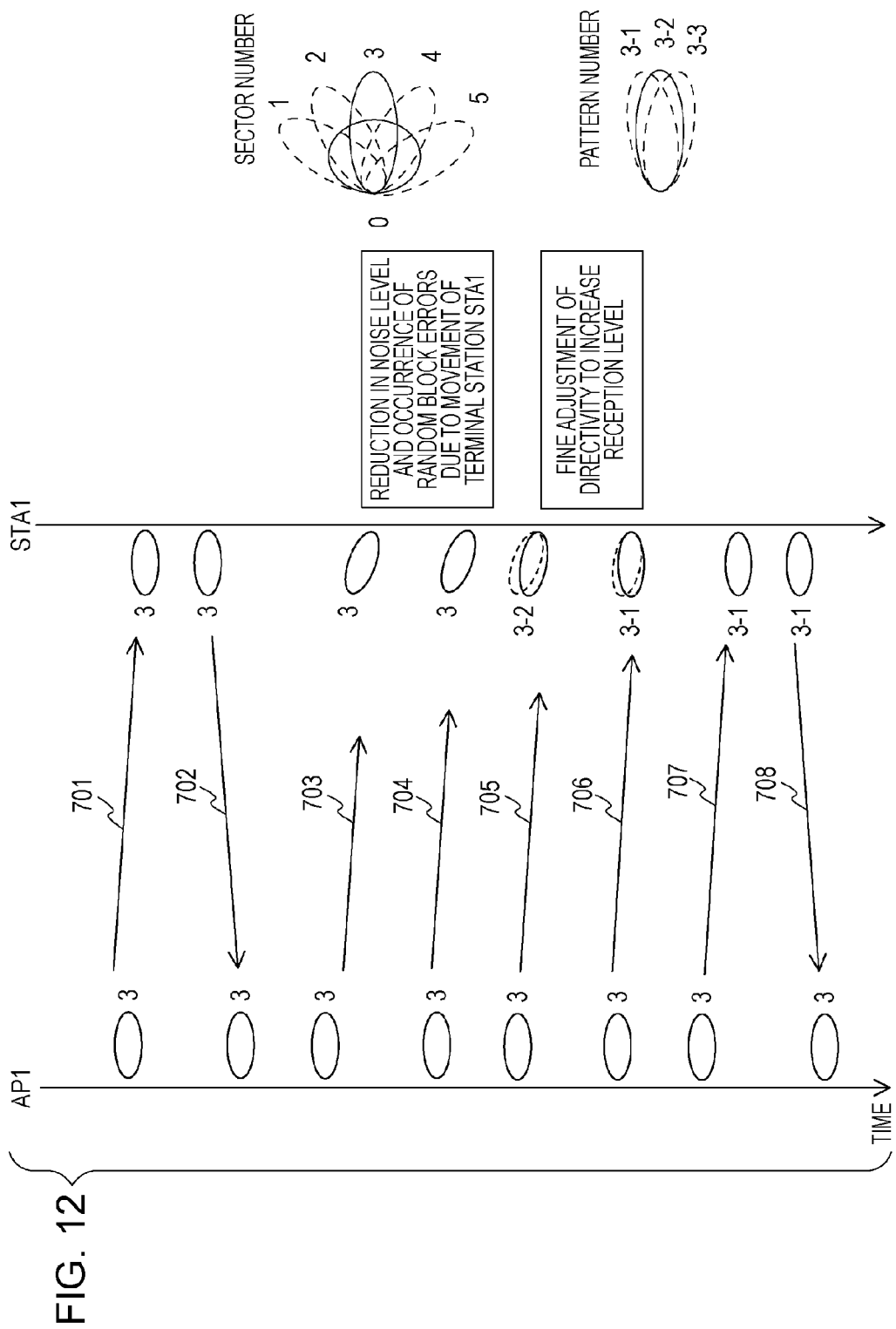
FIG. 12 is a diagram illustrating packet switching and change of directivity in time series in communication between an access point AP1 and a terminal station STA1.

FIG. 12 is a diagram illustrating packet switching and change of directivity in time series in communication between the access point AP1 and the terminal station STA1. Here, an example is illustrated where the local terminal station is the terminal station STA1, and the communication destination station is the access point AP1.

In FIG. 12, time flows from the top to the bottom, packets 701 to 708 each indicate the direction of a transmission packet by an arrow, and each of the access point AP1 and the terminal station STA1 indicates a beam pattern used for transmission or reception.

In the access point AP1 and the terminal station STA1, initial beam-forming training has been completed before the start of communication, and the access point AP1 has selected the sector number 3 and the terminal station STA1 has selected the sector number 3.

First, the access point AP1 transmits the packet 701 using the beam pattern of the sector number 3. The terminal station STA1 is on standby for reception using the beam pattern of the sector number 3 and receives the packet 701.

When the received packet 701 is demodulated without an error, the terminal station STA1 transmits an ACK packet 702 using the beam pattern of the sector number 3. The access point AP1 receives the ACK packet 702 using the beam pattern of the sector number 3, and detects successful communication via the packet 701.

Subsequently, the access point AP1 transmits a packet 703 using the beam pattern of the sector number 3. However, the orientation of the terminal station STA1 has changed and the beam pattern of the sector number 3 has a deviated directivity.

For this reason, the reception level at the terminal station STA1 decreases, and a demodulation error occurs in the received packet at the terminal station STA1. Because a demodulation error has occurred and normal demodulation of the received packet is difficult, the terminal station STA1 omits transmission of an ACK packet. Since no ACK packet is received, the access point AP1 determines that the communication via the packet 703 has failed, and transmits a resent packet 704 to the terminal station STA1.

In the terminal station STA1, the directivity of the beam pattern has deviated, and thus the reception level decreases and a demodulation error occurs in the received packet. Similarly to the packet 703, the terminal station STA1 omits transmission of an ACK packet because of the demodulation error.

Here, the terminal station STA1 determines whether or not a block error has continuously occurred in the packet, in accordance with the procedure illustrated in FIG. 11. When it is determined that random block errors have occurred due to decrease in the reception level, the terminal station STA1 finely adjusts the directivity so as to decrease the reception level. As a result of the fine adjustment, the terminal station STA1 selects a pattern number 3-2 as the directivity for increasing the reception level, and prepares for receiving the next packet.

Since transmission of an ACK packet in response to the resent packet 704 is omitted, the access point AP1 determines that the communication via the resent packet 704 has failed, and transmits a resent packet 705 to the terminal station STA1.

The terminal station STA1 receives the resent packet 705 using the beam pattern of the pattern number 3-2. The terminal station STA1 determines whether or not directivity adjustment should be made, based on the occurrence situation of a block error in the received resent packet 705. The terminal station STA1 stops transmission of an ACK packet until fine adjustment of the directivity is completed.

The terminal station STA1 further adjusts the directivity of the beam pattern finely. Here, as a result of determination of random block errors, the terminal station STA1 selects a pattern number 3-1 for further finely adjusting the directivity so as to increase the reception level, and prepares for receiving the next packet.

Since transmission of an ACK packet in response to the resent packet 705 is omitted, the access point AP1 determines that the communication via the resent packet 705 has failed, and transmits a resent packet 706 to the terminal station STA1.

The terminal station STA1 receives the resent packet 706 using the beam pattern of the pattern number 3-1. The terminal station STA1 determines whether or not directivity adjustment should be made, based on the occurrence situation of a block error in the received resent packet 706. In the case where no beam pattern for another pattern number is left in the multiple patterns for adjusting the directivity to increase the reception level and no demodulation error of the received packet occurs, the terminal station STA1 determines the pattern number of the directivity after the fine adjustment. Here, the terminal station STA1 selects the pattern number 3-1 as the directivity after fine adjustment to form a beam pattern, and prepares for receiving the next packet.

Since transmission of an ACK packet in response to the resent packet 706 is omitted, the access point AP1 determines that the communication via the resent packet 706 has failed, and transmits a resent packet 707 to the terminal station STA1.

The terminal station STA1 receives the resent packet 707 using the beam pattern of the pattern number 3-1. When the received resent packet 707 is successfully demodulated, the terminal station STA1 transmits an ACK packet 708 using the beam pattern of the pattern number 3-1. The access point AP1 receives the ACK packet 708 using the beam pattern of the sector number 3, and detects that the communication via the resent packet 707 is successful.

Hereinafter, the access point AP1 transmits a packet using the beam pattern of the sector number 3, and the terminal station STA1 receives a packet using the beam pattern of the pattern number 3-1.

In this manner, when occurrence of random block errors in a packet is detected, the terminal station STA1 determines that deviation of the directivity causes a decrease in the reception quality higher than or equal to a predetermined value, for example, decrease in the reception level causes a demodulation error, and the terminal station STA1 finely adjusts the beam pattern to achieve a directivity that allows an increase in the reception quality, for example, an increase in the reception level, and performs tracking of the directivity.

Figure 13:
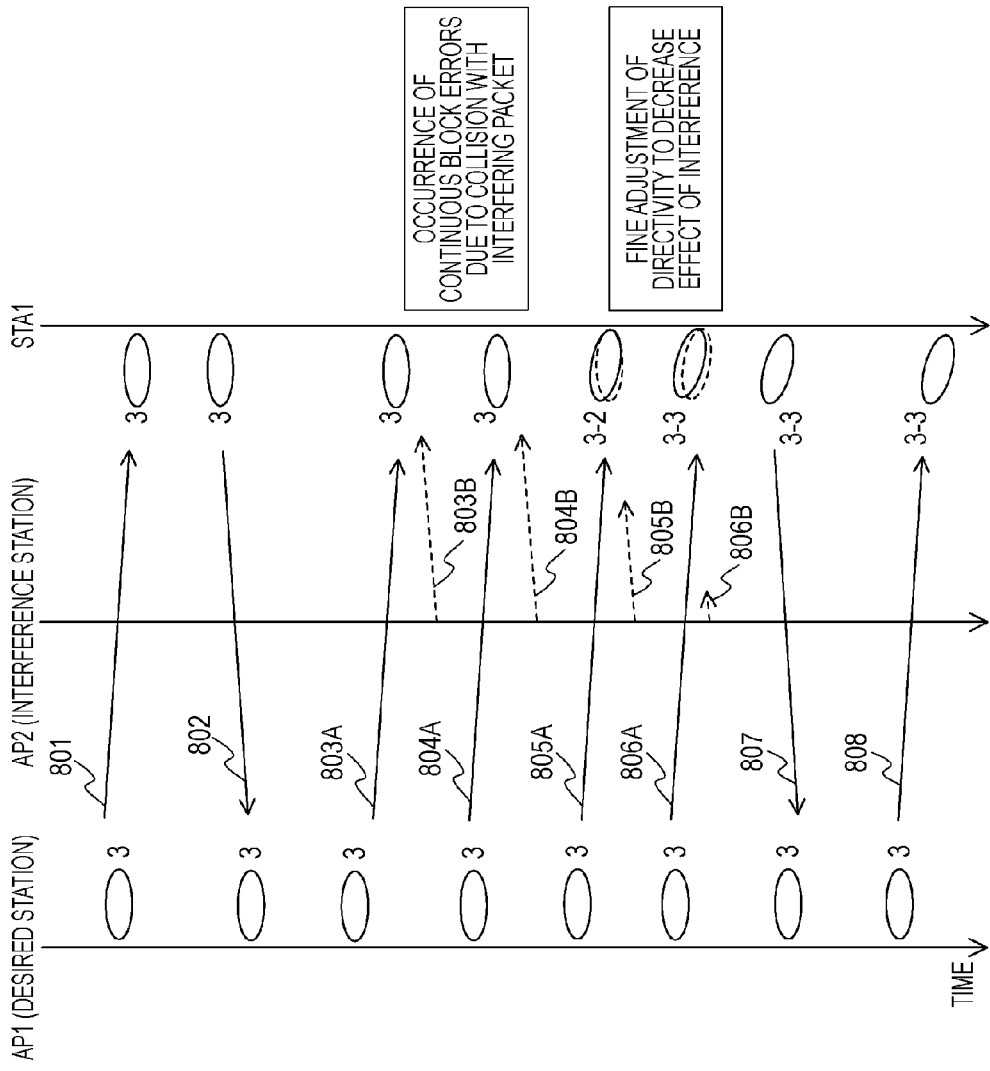
FIG. 13 is a diagram illustrating packet switching and change of directivity in time series in the case where collision of an interfering signal from the access point AP2 occurs in the communication between the access point AP1 and the terminal station STA1.

FIG. 13 is a diagram illustrating packet switching and change of directivity in time series in the case where collision of an interfering signal from the access point AP2 occurs during the communication between the access point AP1 and the terminal station STA1. Here, an example is illustrated where the local terminal station is the terminal station STA1, the communication destination station is the access point AP1, and an interference station is the access point AP2.

Similarly to FIG. 12, in FIG. 13, time flows from the top to the bottom, packets 801 to 808 each indicate the direction of a transmission packet by an arrow, and each of the access point AP1 and the terminal station STA1 indicates which beam pattern is used for transmission or reception. Packets 803B to 806B illustrated by a dashed arrow in FIG. 13 are interfering signals transmitted from the access point AP2, and overlapped in time with packets 803A to 806A transmitted from the access point AP1, and are received by the terminal station STA1.

In FIG. 13, in the access point AP1 and the terminal station STA1, initial beam-forming training has been completed before the start of communication, and the access point AP1 has selected the sector number 3 and the terminal station STA1 has selected the sector number 3.

First, the access point AP1 transmits the packet 801 using the beam pattern of the sector number 3. The terminal station STA1 receives the packet 801 using the beam pattern of the sector number 3.

When the received packet 801 is successfully demodulated, the terminal station STA1 transmits an ACK packet 802 using the beam pattern of the sector number 3. The access point AP1 receives the ACK packet 802 using the beam pattern of the sector number 3, and detects that the communication via the packet 801 is successful.

Subsequently, the access point AP1 transmits the packet 803A using the beam pattern of the sector number 3. The packet 803B is also transmitted from the access point AP2 as an interference station, and at least portions of the packet 803A and the packet 803B are overlapped in time and received by the terminal station STA1.

At the overlapped portions of the multiple packets 803A and 803B in the terminal station STA1, a demodulation error occurs even when the reception level is favorable. Because a demodulation error has occurred and normal demodulation of the received packet is difficult, the terminal station STA1 omits transmission of an ACK packet.

Since no ACK packet is received, the access point AP1 determines that the communication via the packet 803A has failed, and transmits a resent packet 804A to the terminal station STA1. A packet 804B is also transmitted from the access point AP2, and the packets 804A and 804B collide with each other in time again at a different timing from that of the packet 803A.

For this reason, a demodulation error occurs at the terminal station STA1. Similarly to the packet 803A, the terminal station STA1 omits transmission of an ACK packet because of the demodulation error.

The terminal station STA1 determines whether or not a block error has continuously occurred in the packet, in accordance with the procedure illustrated in FIG. 11. Here, in an overlapping time interval between the interfering packet 804B and the packet 804A, a block error occurs continuously. Thus, the terminal station STA1 determines that continuous block errors have occurred, and further determines whether or not the reception level has decreased. When the reception level has not decreased, the terminal station STA1 determines that continuous block errors due to collision with an interfering packet have occurred.

Thus, the terminal station STA1 finely adjusts the directivity so as to decrease the interference level, the adjusted directivity corresponding to one of the multiple patterns and serving as a direction in which the effect of interference decreases. In order to finely adjust the directivity of a pattern so as to decrease the interference level, the terminal station STA1 selects the pattern number 3-2, and prepares for receiving the next packet.

Since transmission of an ACK packet in response to the resent packet 804A is omitted, the access point AP1 determines that the communication via the resent packet 804A has failed, and transmits a resent packet 805A to the terminal station STA1. A packet 805B is also transmitted from the access point AP2, and the packets 805A and 805B collide with each other in time again at a different timing from that of the packet 804A.

The terminal station STA1 receives the resent packet 805A using the beam pattern of the pattern number 3-2. Here, the terminal station STA1 determines whether or not directivity adjustment should be made, based on the occurrence situation of a block error in the received resent packet 805A. The terminal station STA1 stops transmission of an ACK packet until fine adjustment of the directivity is completed.

The terminal station STA1 further adjusts the directivity of the beam pattern finely. Here, as a result of determination of continuous block errors, the terminal station STA1 selects a pattern number 3-3 for further finely adjusting the directivity so as to decrease the interference level, and prepares for receiving the next packet.

Since transmission of an ACK packet in response to the resent packet 805A is omitted, the access point AP1 determines that the communication via the resent packet 805A has failed, and transmits a resent packet 806A to the terminal station STA1. A packet 806B is also transmitted from the access point AP2, and the packets 806A and 806B collide with each other in time again at a different timing from that of the packet 805A.

The terminal station STA1 receives the resent packet 806A using the beam pattern of the pattern number 3-3. Here, the terminal station STA1 determines whether or not directivity adjustment should be made, based on the occurrence situation of a block error in the received resent packet 806A. The terminal station STA1 determines that the resent packet 806A has been successfully demodulated because of the reception of the beam pattern of the pattern number 3-3.

For this reason, the terminal station STA1 determines that occurrence of a demodulation error in the received packet is successfully avoided by the re-adjusting the directivity so as to decrease the interference level, and the terminal station STA1 determines the pattern number of the directivity after the fine adjustment. Here, the terminal station STA1 selects the pattern number 3-3 as the directivity after fine adjustment to form a beam pattern, and prepares for receiving the next packet.

Since the received packet has been successfully demodulated, the terminal station STA1 transmits an ACK packet 807 using the beam pattern of the pattern number 3-3. The access point AP1 receives the ACK packet 807 using the beam pattern of the sector number 3, and detects that the communication via the resent packet 806A is successful.

Hereinafter, the access point AP1 transmits the next packet 808, and the terminal station STA1 receives the packet using the beam pattern of the pattern number 3-3.

In this manner, when occurrence of continuous block errors in a packet is detected, the terminal station STA1 determines that collision of an interfering packet causes a demodulation error, and finely adjusts the beam pattern to achieve a directivity that allows a decrease in block error, that is, a decrease in effect of interference, and performs tracking of the directivity. It should be noted that it has been described that the amount of decrease in reception quality is lower than a predetermined value, or the amount of decrease in reception quality is higher than or equal to a predetermined value, however, it may be described that the amount of decrease in reception quality is lower than or equal to a predetermined value, or the amount of decrease in reception quality is higher than a predetermined value.

As described above, with the radio communication device and the method of controlling directivity in the present embodiment, necessity of directivity tracking is determined based on block errors in a packet. For example, in the case where a block error occurs randomly, it is determined that errors have occurred due to decrease in reception level (decrease in SNR), and the directivity is finely adjusted so as to increase the reception level. Also, in the case where a block error occurs continuously, it is determined that the occurrence of error is due to collision of an interfering packet, and the directivity is finely adjusted so as to decrease the effect of interference. Autonomous avoidance of interference may be implemented with a smaller overhead by the directivity control in the present embodiment.

According to the present embodiment, in the determination of a directivity that achieves favorable reception quality, it is possible to avoid erroneous selection of a directivity in which for example, a desire signal and an interference wave collide, and the reception level is increased and interference is more frequent. Thus autonomous avoidance of interference may be implemented with a smaller overhead.

Various aspects of the embodiments according to the present disclosure include the following.

A radio communication device according to the present disclosure includes: a directivity control unit that configures each of directivities of a plurality of antennas; a directivity switching unit that switches between the directivities of the antennas; a reception quality estimation unit that measures a reception quality of a received signal received by the antennas; and a block error estimation unit that estimates a block error in reception data which is obtained by decoding the received signal. In the case where a block error occurs continuously for a predetermined number of times or longer and an amount of decrease in the reception quality is lower than a predetermined value, the directivity control unit re-adjusts a directivity to decrease the block error, based on a result of the estimation of the block error and a result of the measurement of the reception quality, the re-adjusted directivity being one of the directivities of the antennas.

The radio communication device described above may be such that in the case where a block error occurs randomly and an amount of decrease in the reception quality is higher than or equal to a predetermined value, the directivity control unit re-adjusts a directivity to improve the reception quality, the re-adjusted directivity being one of the directivities of the antennas.

The radio communication device described above may be such that in the case where a block error occurs randomly and an amount of decrease in the reception quality is lower than a predetermined value, the directivity control unit re-adjusts a communication parameter.

A method of controlling a directivity of a radio communication device according to the present disclosure includes: measuring a reception quality of a received signal received by a plurality of antennas; estimating a block error in reception data which is obtained by decoding the received signal; and based on a result of the estimation of the block error and a result of the measurement of the reception quality, re-adjusting a directivity to decrease the block error in the case where a block error occurs continuously for a predetermined number of times or longer and an amount of decrease in the reception quality is lower than a predetermined value, the re-adjusted directivity being one of the directivities of the antennas.

The method of controlling a directivity of a radio communication device described above may be such that in the re-adjusting, in the case where a block error occurs randomly and an amount of decrease in the reception quality is higher than or equal to a predetermined value, a directivity is re-adjusted to improve the reception quality, the re-adjusted directivity being one of the directivities of the antennas.

The method of controlling a directivity of a radio communication device described above may be such that in the re-adjusting, in the case where a block error occurs randomly and an amount of decrease in the reception quality is lower than a predetermined value, a communication parameter is re-adjusted.

Various embodiments have been described with reference to the accompanying drawings in the above. Needless to say, the present disclosure is not limited to those examples. It is apparent that various modifications and alterations will occur to those skilled in the art within the scope of the appended claims, and it should be understood that those modifications and alterations naturally fall within the technical scope of the present disclosure. In a range without departing from the spirit of the present disclosure, the components in the above embodiments may be combined in any manner.

In the above embodiments, the present disclosure has been described by taking an example having a configuration in which hardware is used. The present disclosure, however, may be implemented by software in coordination with hardware.

Each of the functional blocks used for the description of the above embodiments is typically implemented as an LSI which is an integrated circuit. The functional blocks may be individually implemented as a single chip, or a single chip may be implemented to include part or all of the functional blocks. Here, the term LSI is used, however, the term IC, system LSI, super LSI, or ultra LSI may be used depending on the degree of integration.

Also, the technique for circuit integration is not limited to LSI, and the circuit integration may be achieved with a dedicated circuit or a general-purpose processor. Field programmable gate array (FPGA) which is programmable after an LSI is manufactured, or a reconfigurable processor for which connection and setup of the circuit cells inside an LSI are reconfigurable may be utilized.

Furthermore, in the case where new technology of circuit integration which replaces the LSI is invented due to the progress of semiconductor technology or other emerging technologies, functional blocks may be naturally integrated using the new technology. Application of biotechnology may have such potential.

It should be noted that the present disclosure may be implemented as a directivity control method that is executed in a radio communication device. In addition, the present disclosure may be implemented as a directivity control device that is a device having a function of executing the directivity control method, or as a program for causing a computer to execute the directivity control method or the directivity control device. That is, the present disclosure may be implemented in each category of device, method, and program.

The present disclosure has the effect of being capable of avoiding interference autonomously in consideration of interference in data communication, and is useful, for example, as a radio communication device that performs autonomous directivity control and data communication.

What is claimed is:

1. A radio communication device comprising:
   directivity control circuitry, which, in operation, selects a first directivity of a plurality of antenna directivities;
   directivity switching circuitry, which, in operation, switches between the plurality of antenna directivities;
   reception quality estimation circuitry, which, in operation, measures a reception quality of a received signal received by the antennas; and
   block error estimation circuitry, which, in operation, estimates a block error in reception data which is obtained by decoding the received signal,
   wherein in the case where a block error occurs continuously for a determined number of times or longer and an amount of decrease in the reception quality is within a predetermined range, the directivity control circuitry selects a second directivity from among the second directivity and a third directivity, based on a result of the estimation of the block error and a result of the measurement of the reception quality, the second directivity being one of the plurality of antenna directivities, and having less the occurrence of continuous block errors than the first directivity, the third directivity being one of the plurality of antenna directivities, and having a reception quality higher than the first directivity.

2. The radio communication device according to claim 1, wherein in the case where a block error occurs randomly and an amount of decrease in the reception quality is outside the prescribed range, the directivity control circuitry reselects the third directivity from among the second directivity and the third directivity.

3. The radio communication device according to claim 1, wherein in the case where a block error occurs randomly and an amount of decrease in the reception quality is lower than a determined value, the directivity control circuitry re-adjusts a communication parameter.

4. A method of controlling a directivity of a radio communication device, the method comprising:
   selecting a first directivity of a plurality of antenna directivities;
   measuring a reception quality of a received signal received by a plurality of antennas;
   estimating a block error in reception data which is obtained by decoding the received signal; and
   based on a result of the estimation of the block error and a result of the measurement of the reception quality, selecting a second directivity from among the second directivity and a third directivity in the case where a block error occurs continuously for a determined number of times or longer and an amount of decrease in the reception quality is within a predetermined range, the second directivity being one of the plurality of antenna directivities, and having less occurrence of the continuous block errors than the first directivity, the third directivity being one of the plurality of antenna directivities, and having a reception quality higher than the first directivity.

5. The method of controlling the directivity of the radio communication device according to claim 4, further comprising:
   in the case where a block error occurs randomly and an amount of decrease in the reception quality is outside the predetermined range, selecting the third directivity from among the second directivity and the third directivity.

6. The method of controlling the directivity of the radio communication device according to claim 4, further comprising:
   in the case where a block error occurs randomly and an amount of decrease in the reception quality is within the predetermined range, adjusting a communication parameter.

7. The radio communication device according to claim 1, wherein in the case where the block error occurs continuously for the determined number of times or longer and the amount of decrease in the reception quality is outside the predetermined range, the directivity control circuitry selects the third directivity from among the second directivity and the third directivity.

8. The method of controlling the directivity of the radio communication device according to claim 4, further comprising:
   in the case where the block error occurs continuously for the determined number of times or longer and the amount of decrease in the reception quality is outside the predetermined range, selecting the third directivity is from among the second directivity and the third directivity.

* * * * *